No. 839,179. PATENTED DEC. 25, 1906.
J. R. McCOY.
EARTH CHIPPING MACHINE.
APPLICATION FILED JULY 17, 1906.

2 SHEETS—SHEET 1.

Witnesses.
K. K. Keffer.
A. G. Hague.

Inventor.
J. R. McCoy.
by Irving & Lane Attys.

No. 839,179. PATENTED DEC. 25, 1906.
J. R. McCOY.
EARTH CHIPPING MACHINE.
APPLICATION FILED JULY 17, 1906.

2 SHEETS—SHEET 2.

Witnesses.
K. K. Keffer.
A. G. Hague

Inventor
J. R. McCoy.
by Irving & Lane Atty's.

UNITED STATES PATENT OFFICE.

JOSIAH R. McCOY, OF MARSHALLTOWN, IOWA.

EARTH-CHIPPING MACHINE.

No. 839,179.   Specification of Letters Patent.   Patented Dec. 25, 1906.

Application filed July 17, 1906. Serial No. 326,921.

*To all whom it may concern:*

Be it known that I, JOSIAH R. McCOY, a citizen of the United States, residing at Marshalltown, in the county of Marshall and State of Iowa, have invented a certain new and useful Earth-Chipping Machine, of which the following is a specification.

The object of my invention is to provide a machine designed to be advanced over a field and provided with a rotary chipping device designed to be rotated by an engine carried by the frame and said chipping device provided with cutting-blades designed to enter the earth and cut out chips or small sections of the earth and deposit the same in the rear of the rotary chipper to thereby thoroughly loosen and cut up the ground into small pieces and to leave the ground in the best possible condition for future cultivation and at the same time to cut up into small pieces sticks or cornstalks or similar devices lying upon the surface of the ground, so that said articles will not interfere with the cultivation of the ground.

A further object is to provide means whereby the frame may be adjusted to cause the chipper to cut more or less deeply into the ground, and, further, to provide means whereby the chipper may be reversed end for end and be caused to cut from the rear toward the front or from the front toward the rear, as may be found most desirable in operating on ground in different conditions.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1:
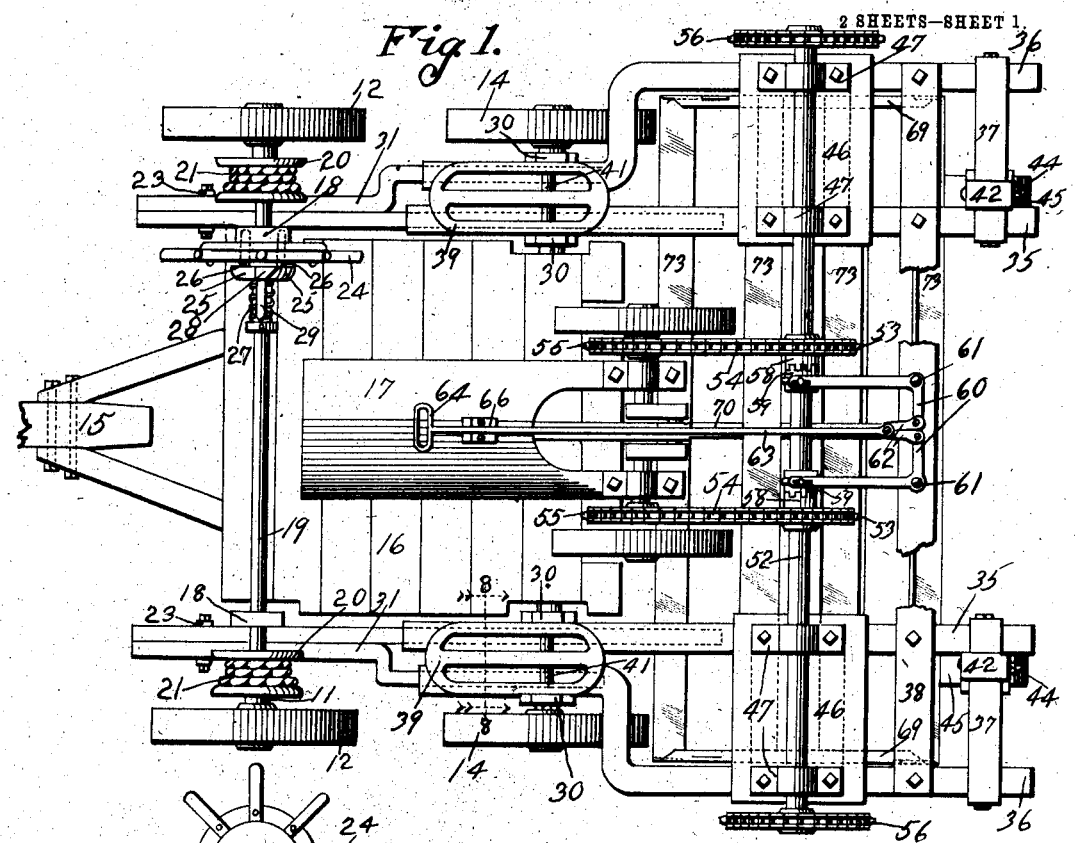
Figure 2:
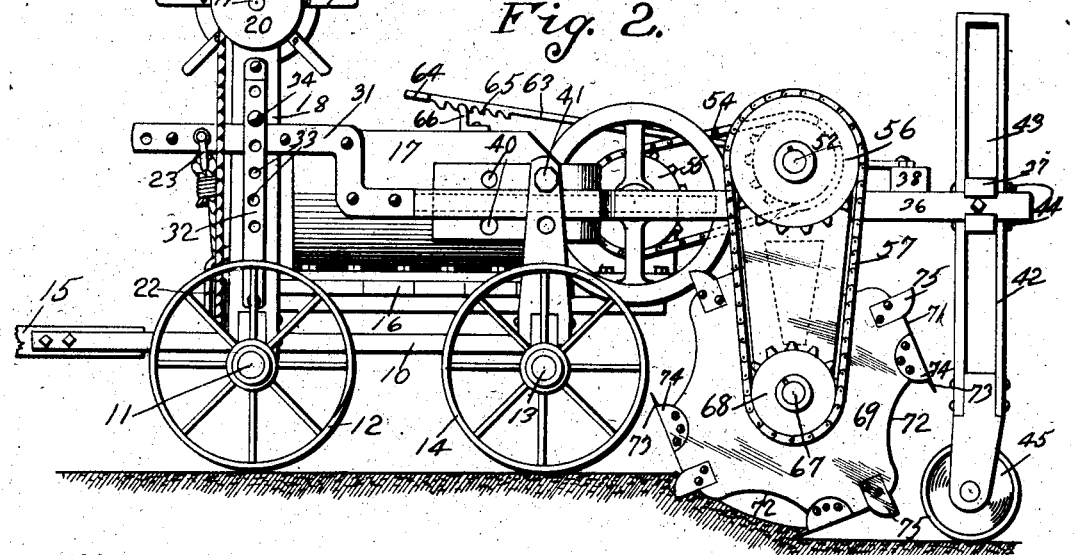
Figure 3:
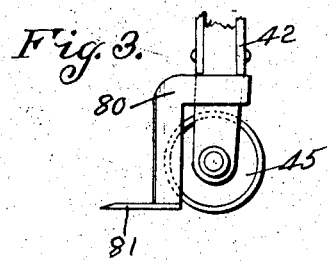
Figure 5:
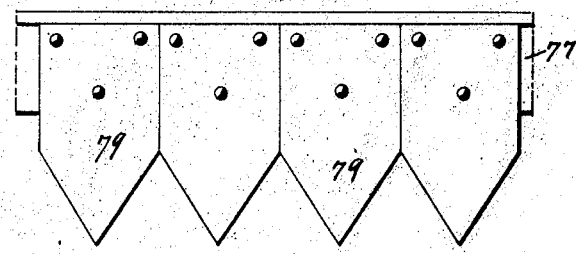
Figure 4:
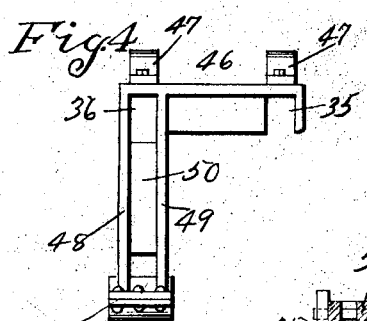
Figure 6:
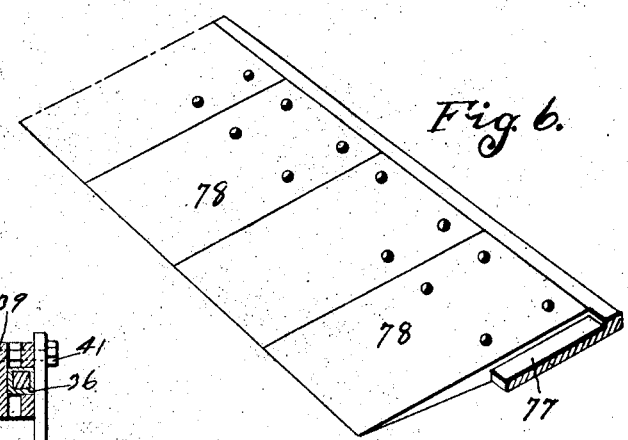
Figure 8:
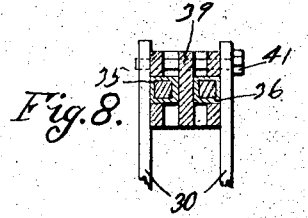
Figure 7:
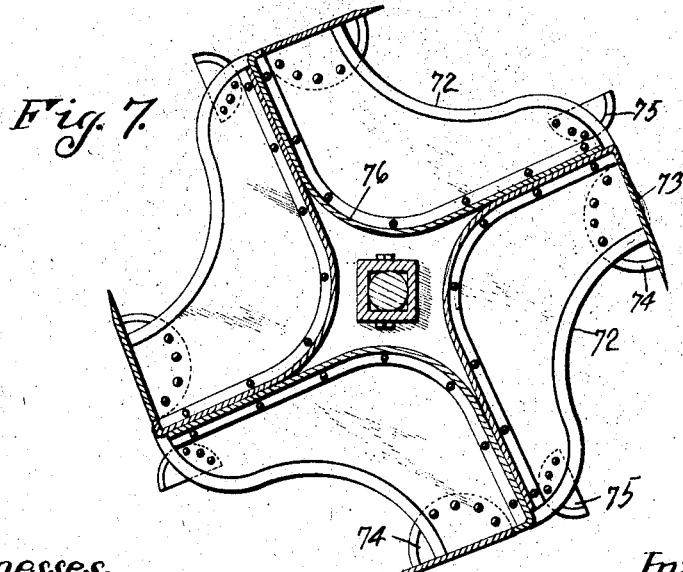

Figure 1 shows a plan view of the complete machine embodying my invention. Fig. 2 shows a side elevation of same. Fig. 3 shows a detail side view of a modified form of rear supporting-wheel. Fig. 4 shows a detail rear view of the bracket for supporting the chipper-axle from the main frame. Fig. 5 shows an enlarged detail view illustrating a modified form of chipping-blade with pointed blade-sections. Fig. 6 shows a perspective view of another modified form of chipping-blade, showing detachable straight-edged sections. Fig. 7 shows a transverse sectional view of a modified form of rotary chipper having an earth-carrying pocket adjacent to each chipping-blade, and Fig. 8 shows a section on line 8 8 of Fig. 1.

Referring to the accompanying drawings, I have used the reference-numeral 10 to indicate the main frame of the machine, having at its forward end the axle 11, provided with the supporting-wheels 12 and having at its rear end the axle 13 with the supporting-wheels 14. At the front of the frame is the tongue 15, to which draft-animals may be attached and on top of the frame is the platform 16, upon the center of which is mounted a gasolene-engine 17 of ordinary construction.

Fixed to each side of the main frame 10, near its front, is an upright 18, and rotatably mounted in the tops of said uprights is the shaft 19. On each end of this shaft is a pulley 20, to each of which a cable 21 is fixed. Said cable extends downwardly and passes under a pulley 22 on the main frame 10 and then upwardly and provided with a hook 23, for purposes hereinafter made clear.

Fixedly mounted on the shaft 19 adjacent to one of the uprights 18 is a hand-wheel 24, and slidingly mounted on the shaft 19 adjacent to said hand-wheel are two half-collars 25, each of which has a pin 26, designed to extend through the hand-wheel and into the upright 18, thus securely locking the hand-wheel and shaft 19 against rotation. A spring 27 is provided for normally holding the pins 26 in position in engagement with the upright 18; but I have provided for removing said pins from the upright 18 as follows: 28 indicates a cross-piece having a beveled edge and provided with a handle 29. Said beveled edge engages the parts 25, and when the handle is turned it forces said parts to position for withdrawing the parts 26 and permitting the shaft 19 to freely rotate. By this arrangement of parts the har wheel and its shaft are normally locked and may be released by means of the handle 29, so that the shaft may be rotated by the hand-wheel.

At the rear of the frame 10 on each side are two parallel uprights 30 to support the rotary chipper-frame. This rotary chipper-frame is composed of two sides, each of which is substantially the same, so that but one will be hereinafter described. This side piece comprises a front member 31 to extend under the shaft 19 and to rest against the outer face of the upright 18 and between the upright 18 and a guard-strap 32 on said upright, which guard-strap is provided with openings 33 to receive a limiting-pin 34, to thereby hold the member 31 against either up or down movement, according to the position in which the pin 34 is placed. This member 31 comprises an inner and an outer portion connected at their forward ends and spaced apart at their rear ends. The rear portion of the side piece of the chipper-supporting frame is formed of two hollow members, the inner one, 35, being straight and having the inner portion of the frame 31 telescopically connected with its forward end, and the outer member, 36, is spaced apart at its rear a considerable distance from the member 31; but its forward end is inclined inwardly toward the member 35 and then forwardly, where the outer part of the member 31 is telescopically inserted in it. The parts 35 and 36 are connected at their rear ends by the cross-piece 37 and also by a cross-piece 38, which extends entirely across the rear of the machine. The forward ends of the parts 35 and 36 are slidingly inserted in grooves in a connecting-block 39, which block is provided with a number of transverse openings 40, designed to receive a pin 41, which pin is passed through the uprights 30, so that said block is adjustably connected with the said uprights, and the parts 35 and 36 are slidingly connected with said block and with the forward member 31.

The rear ends of the parts 35 and 36 are adjustably supported by means of an upright 42, having a longitudinal slot 43 to receive the cross-piece 37. This upright is bolted to the cross-piece by the bolts 44, so that it may be vertically adjusted relative to the cross-piece. At the lower end of the upright 42 is a supporting-wheel 45, designed to rest upon the ground-surface in the rear of the rotary chipper, so that it will run on the level place cut out by the chipper and always maintain the rear end of the frame at the proper elevation from the ground-surface.

I have provided for supporting the rotary chipper as follows: Mounted upon the parts 35 and 36 in front of the cross-piece 38 is a supporting-bracket comprising a top plate 46, with two bearing-boxes 47 on its upper surface and two openings on its under surface to receive the parts 35 and 36. Extending downwardly from the plate 46 are two side pieces 48 and 49, with the block 50 between them and having at their lower ends a bearing-box 51. A shaft 52 is mounted in the bearing-boxes 47 at both sides of the machine and has fixed thereto two sprocket-wheels 53, connected by the chains 54 with the sprocket-wheels 55 on the engine-shaft, and fixed to the outer ends of the shaft 52 are two sprocket-wheels 56, connected by the sprocket-chains 57 with sprocket-wheels on the ends of the rotary chipper-shaft, as will appear hereinafter.

I have provided for throwing the engine into or out of driving engagement with the shaft 52 as follows: On the hub of each sprocket-wheel 53 is a clutch member 58, and slidingly mounted on the shaft 52 adjacent thereto is a clutch member 59. Connected with each of said clutch members 59 is a bell-crank lever 60, fulcrumed to the pin 61 and having a link 62 pivoted to its inner end. Both of the links 62 are connected to a rod 63, having a handle 64 and a rack 65, which rack is designed to engage a lug 66 on top of the engine, so that by operating this rod the clutches 59 may be held in engagement with the clutch members 58 or in position out of engagement.

The rotary chipper proper comprises a shaft 67, of approximately the same length as the shaft 52 and having fixed to its outer ends the sprocket-wheels 68, to be engaged by the chains 57. Near each end portion of the shaft 67 is a substantially disk-shaped cutter-head 69, and fixed to the center of the shaft is a supporting-disk 70. At one or more points (preferably four) on each of the disks 69 and 70 is a flat surface 71, and between these flat surfaces the disks are curved inwardly at 72. On each flat surface 71 is a blade 73, to extend across the entire width of the machine from one of the disks 69 to the other. The cutting edge of said blade 73 projects outwardly over the cut-away portion 72, and adjacent to the outer end of each blade 73 is an edge-cutting blade 74, arranged parallel with the disk 69 and presenting a sharpened curved portion projecting beyond the cut-away portion 72 and inside of the blade 73. At the rear side of each blade 73 is another edge-cutting blade 75, to extend outwardly from the center of the rotary cutter beyond the blade 73, and thus cut into the ground at the sides of the furrow being made. In some conditions of the soil it is desirable to use the rotary chipper in the form just described with only the four cutting-blades 73 extending across from one of the disks 69 to the other. However, in other conditions of the ground it is desirable to use a rotary chipper constructed in the manner shown in the modified form in Fig. 7. This modification comprises substantially triangular-shaped pockets 76, the outer edges of which extend from the rear of one blade 73 to the rear of the other and also extend the entire length of the rotary chipper, so that earth cut loose by one of the blades will fall into the adjacent pocket and be carried around until said pocket stands in an inverted position, whereupon the earth will be discharged from the pocket.

In the modified form shown in Fig. 6 the cutting-blade is composed of a cross-piece 77, having a series of sharpened blade-sections 78 riveted thereto. In this form of the device if any of the blades should become dulled or nicked said blades will be removed and new ones substituted therefor without the necessity of furnishing an entirely new blade extended across the entire cutter.

In the modified form shown in Fig. 5 these blade-sections are provided with sharpened points 79, which will be used to advantage in some conditions of the soil of the ground.

In Fig. 3 of the drawings I have shown a device for removing clods of earth or the like from in front of the supporting-wheels 45. This device comprises an arm 80, fixed to the upright 42 and extended forwardly and then downwardly in front of the wheel 45, and at its bottom is a fixed blade 81 to project forwardly in a plane slightly above the bottom of the wheel 45.

In practical use and assuming the machine to be in the position shown in Fig. 2 of the drawings then the draft-animals attached to the tongue are caused to advance the machine over the field and the engine is operated in a direction to rotate the lower cutting-blades in a forward and upward direction. This will cause each blade in succession to cut from the ground a chip or thin section extending the entire width of the machine to points outside of the paths of the supporting-wheels 12 and 14, and the chips or sections thus cut will be turned over by the blades and deposited in the rear of the rotary chipper, so that the ground will be left lying in a thoroughly pulverized and loose condition ready for forming a seed-bed without the necessity of using pulverizers, harrows, or other implements. The blades 74 and 75 will cut off any sod or roots or the like, so that the chips or earth-sections will be easily removed from the ground at the edges of the cut being made. If it is desired to cause the rotary chipper to cut more deeply into the ground, the upright 42 is adjusted relative to the rear end of the chipper-supporting frame, and the windlass at the front of the main frame is also adjusted to accomplish this result. If it is desired to elevate the chipper above the ground, this may be done by means of the windlass at the front, which will cause the entire chipper-supporting frame to be tilted upwardly at its rear end. The rotary chipper may also be adjusted forwardly and rearwardly by means of the pins 41 in the openings 40. In some instances it is desirable to operate the rotary chipper with the blades engaging the ground at the front and moving downwardly and rearwardly to complete the cut. When it is desired to do this, the shaft of the rotary chipper is removed and the chipper turned end for end and replaced in the frame. Then a reverse movement is imparted to the engine and the blades will first strike on top of the ground and then cut downwardly and rearwardly. One of the advantages to be derived from this use of the rotary chipper is that it will cut up stalks and roots and the like lying upon the top of the ground more thoroughly than would be by the other method of procedure.

Having thus described my invention, what I claim, and desire to secure by Letters Patent of the United States therefor, is—

1. In a machine of the class described, the combination of a frame, a rotary shaft supported by the frame, means for rotating the shaft, a number of disks fixed to the shaft and having a number of flat faces on its periphery, with depressions between the flat faces, knife-blades fixed to the flat portions of the disks and extended paralled with the axle, and edge-trimming blades adjacent to the cutting edges of the knives and extended from the said knives over the depressions in the disks, and a number of edge-trimming blades back of the knives and projecting beyond the disk.

2. In a device of the class described, a rotary chipper, comprising a central shaft, disks fixed to the ends of the shaft, a disk fixed to the center of the shaft, a number of earth-cutting knives fixed to said disk, substantially parallel with the shaft, and earth-carrying pockets arranged between the disks and extending from one knife to the other.

3. In a device of the class described, a rotary chipper, comprising a shaft, disks at the ends of the shaft and a disk at the center of the shaft, each disk having a number of flat surfaces on its periphery, with depressions between said flat surfaces, earth-cutting knives fixed to said flat surfaces and projecting beyond the edges of the disks in a direction over the depressions thereof, and sheet-metal partitions for forming earth-carrying pockets extending from the rear edge of each knife between the disks in a direction toward the axles and then outwardly to the back of the adjacent knife.

4. In a device of the class described, a rotary chipper, comprising a shaft, disks at the ends of the shaft and a disk at the center of the shaft, each disk having a number of flat surfaces on its periphery, with depressions between said flat surfaces, earth-cutting knives fixed to said flat surfaces and projecting beyond the edges of the disks in a direction over the depressions thereof, sheet-metal partitions for forming earth-carrying pockets, extending from the rear edge of each knife between the disks in a direction toward the axles and then outwardly to the back of the adjacent knife, and edge-trimming blades adjacent to the cutting edge of each knife extending from a point near said cutting edge inwardly over the depression in the disk, and edge-trimming blades adjacent to the rear edge of the knives projecting beyond the disks.

5. In a device of the class described, a rotary chipper, comprising a shaft, disks at the ends of the shaft and a disk at the center of the shaft, each disk having a number of flat surfaces on its periphery, with depressions between said flat surfaces, earth-cutting knives fixed to said flat surfaces and projecting beyond the edges of the disks in a direction over the depressions thereof, sheet-metal partitions for forming earth-carrying pockets extending from the rear edge of each knife between the disks in a direction toward the axles and then outwardly to the back of the adjacent knife, said earth-cutting knives each comprising a cross-piece and a series of detachable blades.

6. In a device of the class described, a rotary chipper, comprising a shaft, disks at the ends of the shaft and a disk at the center of the shaft, each disk having a number of flat surfaces on its periphery, with depressions between said flat surfaces, earth-cutting knives fixed to said flat surfaces and projecting beyond the edges of the disks in a direction over the depressions thereof, and sheet-metal partitions for forming earth-carrying pockets extending from the rear edge of each knife between the disks in a direction toward the axles and then outwardly to the back of the adjacent knife, said earth-cutting knives each comprising a cross-piece and a series of detachable blades, said blades pointed at their forward ends.

7. In a device of the class described, the combination of a frame, supporting-wheels therefor, an auxiliary frame projecting in the rear of the main frame and capable of tilting movement up and down, means for adjustably supporting the rear end of said auxiliary frame, a rotary chipper carried by the auxiliary frame, an engine carried by the main frame, and means for operating the rotary chipper from said engine.

8. In a machine of the class described, the combination of a main frame, supporting-wheels therefor, uprights near the rear of the main frame, blocks pivoted to said uprights, an auxiliary frame comprising independent front and rear sections, the rear sections slidingly connected with said blocks and the front sections slidingly connected with the rear ones, means for vertically adjusting the forward ends of the front sections, adjustable wheel-supports for the rear ends of the rear sections, and a rotary earth-chipping device mounted on the auxiliary frame in front of the rear supporting-wheel, and means for rotating said earth-chipper.

9. In a machine of the class described, the combination of a main frame, supporting-wheels therefor, uprights near the rear of the main frame, blocks pivoted to said uprights, an auxiliary frame comprising independent front and rear sections, the rear sections slidingly connected with said blocks and the front sections slidingly connected with the rear ones, means for vertically adjusting the forward ends of the front sections, adjustable wheel-supports for the rear ends of the rear sections, a rotary earth-chipping device mounted on the auxiliary frame in front of the rear supporting-wheel, means for rotating said earth-chipper, and clod-removing blades supported in front of the wheels of the rear supports.

10. An earth-chipping machine, comprising a main frame, supporting-wheels therefor, a platform thereon, an engine mounted upon said platform, a tongue at the forward end of the platform, uprights at the rear of the frame, blocks pivotally and adjustably supported on said rear uprights, an auxiliary frame, each side thereof being composed of front and rear sections, each side of the rear section formed of two parts spaced apart at their rear ends and adjacent to each other at their forward ends, and slidingly connected at their forward ends, with said blocks, the front section of each side of the auxiliary frame being composed of two parts secured together at their forward ends and spaced apart at their rear ends, and telescopically connected with the forward ends of said rear frame members, a windlass supported above the forward end of the frame and means connected therewith for pulling the forward end of the auxiliary frame downwardly, means for adjustably securing the forward ends of the auxiliary frame in different positions of vertical adjustment, a connecting-piece for the rear ends of the auxiliary frame, and wheeled uprights adjustably connected with the rear ends of the auxiliary frame, a shaft supported near the rear end of the auxiliary frame, means for rotating said shaft from the engine, a clutch device for throwing said driving means in and out of gear, a rotary earth-chipper, means for supporting same below said shaft, and means for operatively connecting the rotary chipper with said shaft JOSIAH R. McCOY.

Witnesses:
W. M. CLARK,
W. A. MEESE.